Figure 1:
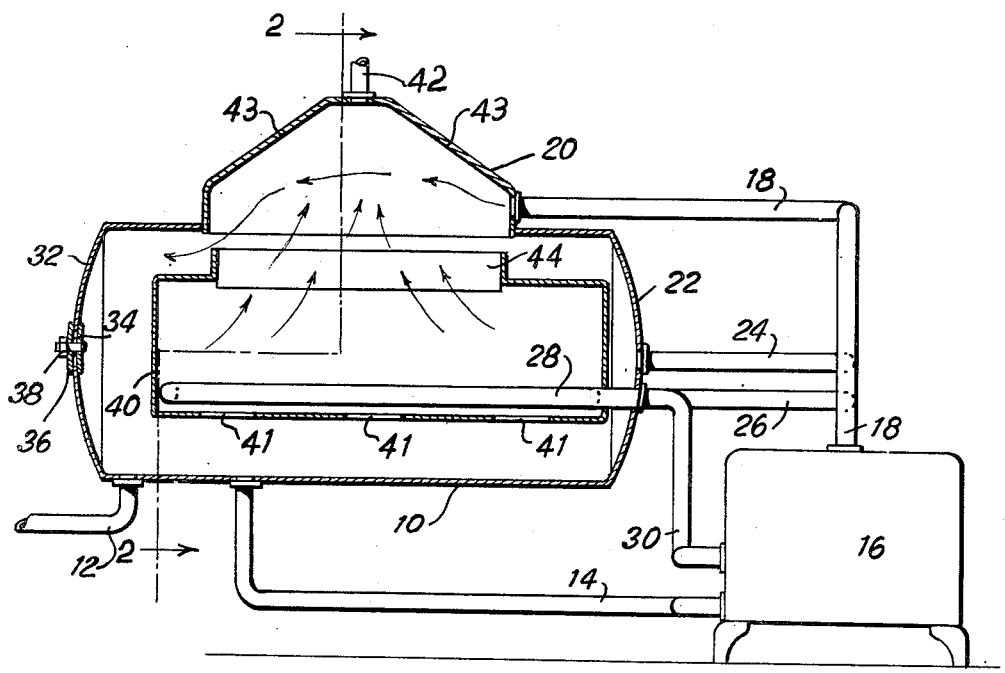

Feb. 8, 1944.  H. DEL MAR  2,341,365

HOT WATER STORAGE TANK

Filed March 4, 1940

INVENTOR

Harry Del Mar

Patented Feb. 8, 1944

2,341,365

UNITED STATES PATENT OFFICE 2,341,365

HOT WATER STORAGE TANK

Harry Del Mar, New York, N. Y.

Application March 4, 1940, Serial No. 322,180

1 Claim. (Cl. 122—13)

My invention relates to an improved hot water storage tank and presents certain new and improved features which result in a purer water supply therefrom, an improved distribution of water throughout the tank, and an improved system for the elimination of the gases which are generated in the process of water heating, and which otherwise remain trapped within the tank, by reason of flat surfaces which do not permit the gases to pass with the water, from the tank to the water outlet, when circulation is started by opening faucets or other outlets. Longer life is given to the tank metal as a result of the elimination of the gases produced in the process of water heating.

The collection of mineral and vegetable sediment and particles of corrosive matter circulate within the water in the common types of hot water storage tanks now in use, which tend to contaminate the water supply, the mineral and vegetable sediment coming in with the water supply and the corrosion forming on the inner surface of the metallic tank, are combined with gases formed in making hot water and when the gases are bottled up, cause pitting of the tank metal to a greater degree than would occur if the gases could escape and pass out of the tank with the natural course and flow of the water toward the tank outlet.

The tanks of this class now in use do not allow all of the gases to escape on account of the flat surfaces at the top of the tank, whereas in the tank of this invention, with an inclined domed portion, all of the gases can escape with the natural flow and course of the water toward the tank outlet.

The principal object of the invention is to give longer life to the tank metal, by eliminating gases.

Another object is to give a purer water supply and quicker circulation by shaping the upper part of the tank, with an inclined domed portion.

Still another object is to decrease cost of operation and maintenance by effecting the objects above cited.

Most corrosion and pitting takes place at the top of the tank, working toward the side centre of the tank and rapidly decreasing until within about twelve inches from the bottom. Very seldom if ever is the bottom of the tank affected as the water is colder and the gases rise toward the top of the tank, as the water becomes hotter. Holes usually appear in the tank metal for about 12 inches each side of the top centre and for about 30 inches from tank centre to each tank head.

The domed portion being inclined causes the hot water to quickly circulate toward the outlet and holds a large reserved body of hot water for quick delivery to the tank outlet line. There may be a hot water inlet line in the centre of the tank head but this circulation is not as rapid as the circulation in the domed portion as a large body of water between the tank inlet and the tank outlet, has to be equalized before reaching the tank outlet line, in order to get hot water.

There is a third means of bringing hot water to the domed portion such as by indirect heating, by means of a hot water coil with a hood to direct the hot water, thus produced, direct to the superstructure.

In the drawing I have shown a preferred embodiment of the invention in which Fig. 1 shows a longitudinal section through a water tank.

Figure 2:
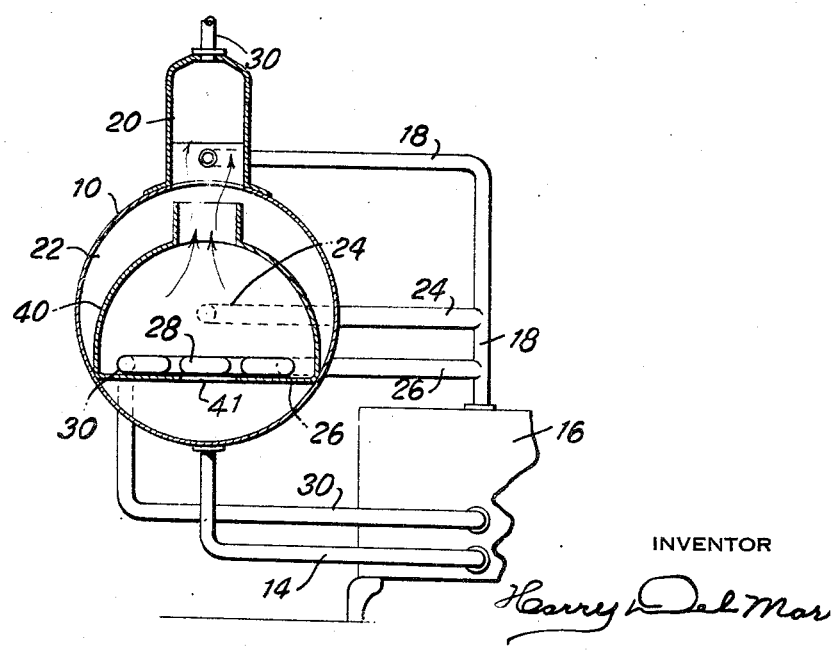

Figure 2 is a transverse section taken on lines 2—2 on Fig. 1.

The device comprises a horizontally disposed cylindrical tank structure or shell 10 having an elongated domed portion 20 intermediate its ends, which domed portion is provided with inclined surfaces 43—43 sloping upwardly toward a hot water outlet pipe 42.

Water enters the tank shell 10, from a cold water supply line 12, and passes down a return line 14 to a heater 16, thence up through a hot water main line 18, to the domed portion 20, also to the centre of the tank head 22, through a branch hot water feed line 24. Another branch hot water feed line 26, feeds a hot water heating coil 28 which returns to the heater 16 through a return line 30.

The heating coil 28 is substantially enclosed within a casing 40, said casing having a suitable outlet 44 through the upper surface thereof to direct the coil heated water into the domed portion 20 in the manner indicated by the arrows. The coil heated water further mixes with hot water entering the dome portion 20 through the hot water inlet pipe 18 as well as with hot water entering the tank 10 through the hot water inlet pipe 24. Withdrawal of the hot water from the dome 20 is effected through outlet 42.

From the foregoing it will be apparent that the domed portion 20 with its inclined surfaces 43—43 will prevent the deposit of foreign matter and will thereby prevent pitting or corrosion at that portion of the tank wall immediately surrounding the hot water outlet 42.

By means of a plurality of openings indicated in the base of the casing 40 at 41, water is adapted to pass from the tank 10 to the said casing.

Various changes can be made in the structure here shown and described as forming this invention, any modification still being within the scope of the invention here claimed, if the principles of construction and results above described are substantially preserved.

Having described my invention, I claim:

In a hot water storage tank, a horizontal cylindrical tank structure having an elongated domed portion intermediate its ends and along the top of the tank, said domed portion being provided with inclined surfaces sloping upwardly to a hot water outlet pipe, the tank being provided with cold water supply connections and with hot water inlet connections and the domed member having a hot water inlet pipe.

HARRY DEL MAR.